United States Patent
Fedan

[19]

[11] Patent Number: 6,088,251
[45] Date of Patent: Jul. 11, 2000

[54] LINEARIZED DUTY RADIO, VARIABLE FREQUENCY SWITCHING REGULATOR

[76] Inventor: Orest Fedan, 22 Betts Rd., Belmont, Mass. 02478

[21] Appl. No.: 09/350,682

[22] Filed: Jul. 9, 1999

[51] Int. Cl.[7] .............................. H02M 7/00; G05F 1/40; G05F 1/44
[52] U.S. Cl. .......................... 363/124; 323/280; 323/351
[58] Field of Search ............................. 363/124; 323/273, 323/274, 275, 280, 282, 284, 349, 351

[56] References Cited

U.S. PATENT DOCUMENTS

| | | | |
|---|---|---|---|
| 3,294,981 | 12/1966 | Bose | 307/88.5 |
| 3,418,578 | 12/1968 | bose | 325/45 |
| 3,624,638 | 11/1971 | Riseman | 341/169 |
| 3,659,184 | 4/1972 | Schwarz | 327/100 |
| 3,891,902 | 6/1975 | Konrad | 318/139 |
| 3,959,716 | 5/1976 | Gilbert, Jr. et al. | 323/20 |
| 4,459,539 | 7/1984 | Cordy, Jr. | 323/299 |
| 4,594,541 | 6/1986 | Schott | 323/288 |
| 4,772,995 | 9/1988 | Gautherin et al. | 363/21 |
| 4,814,684 | 3/1989 | McCurdy | 323/222 |
| 4,862,057 | 8/1989 | Contartese et al. | 323/277 |
| 4,959,606 | 9/1990 | Forge | 323/286 |
| 5,160,896 | 11/1992 | McCorkle | 330/251 |
| 5,278,490 | 1/1994 | Smedley | 323/284 |
| 5,594,386 | 1/1997 | Dhuyvetter | 330/251 |
| 5,623,198 | 4/1997 | Massie et al. | 323/282 |
| 5,677,618 | 10/1997 | Fiez et al. | 323/282 |
| 5,680,036 | 10/1997 | Faulk | 323/282 |

*Primary Examiner*—Shawn Riley
*Assistant Examiner*—Bao Q. Vu

[57] ABSTRACT

A control system for a switching regulator which linearizes the relationship between the control input signal and the duty ratio of the pulse output. A logarithmic signal generator furnishes a logarithmically increasing signal to a comparator circuit. The comparator circuit compares the logarithmic signal to a control input signal and triggers a pulse generator such that the frequency of the pulses has an exponential relationship to the control input signal. The pulses are averaged and the average is subtracted from a reference signal. The result is then used as the input to the logarithmic signal generator. The resulting relationship between the duty ratio of the pulse output and the control input signal is linear.

12 Claims, 5 Drawing Sheets

LINEARIZED DUTY RADIO, VARIABLE FREQUENCY SWITCHING REGULATOR

CROSS-REFERENCE TO RELATED APPLICATIONS

Not applicable

BACKGROUND

1. Field of Invention

My switching regulator generally relates to non-constant frequency switching regulator circuitry. More particularly, it concerns a switching circuit that renders the duty ratio of switch ON-time (or OFF-time) to have a linear relationship to an input control voltage.

2. Description of Prior Art

Switching regulators (switching power supplies, switching amplifiers, etc.) utilize fast switching with duty ratio control to achieve efficient power conversion or amplification. Duty ratio control controls the ON-time (or the OFF-time) of the switch relative to the cycle time (cycle time= ON-time+OFF-time). By varying the duty ratio, the average value of the output signal is controlled. This average value, after filtering, is the output of the regulator.

If the cycle time is fixed (constant frequency regulator), a simple circuit can be used to produce a linear relationship between control input signal and duty ratio output. For example, a constant current source charging a capacitor followed by a voltage comparator will produce such a linear relationship if the compare voltage is the control input signal.

Many switching regulators employ variable frequency (cycle time is not fixed) in order to obtain higher efficiency and produce less interference. For example, a flyback converter has higher efficiency if operated in a critically discontinuous mode. Many other types of switching regulators also have higher efficiencies if operated in a discontinuous mode. In variable frequency regulators, the average (filtered) output is no longer linearly related to the ON-time, OFF-time, or cycle time. Simple circuits can not be made to control them. The non-linear relationships usually result in increased sensitivity at one end or both ends of the control range. Such increased sensitivity usually results in oscillation or limit cycling when the control loop is closed.

In McCurdy, U.S. Pat. No. 4,814,684 (Mar. 21, 1989), a second discharge path is turned ON to quickly discharge the timing capacitor. This extends the ON/(ON+OFF) time by reducing the non-linearity of the control relationship, which, in turn, extends the VoutWin ratio. But such a two stage approach gives very limited improvement because for a linear control relationship a square function is desired. The square function comes about from the desire to keep the derivative of [ON/(ON+OFF)] time with respect to a control signal (x), constant. The OFF time is constant, so the above derivative becomes {OFF/[(ON+OFF) squared]} times the derivative of the ON time with respect to x. To satisfy the desired condition, then, the derivative of the ON time with respect to x must be proportional to the (ON time+OFF time) squared.

Smedley, U.S. Pat. No. 5,278,490 (Jan. 11, 1994) describes a cycle by cycle control technique that insures that each cycle has a duty ratio output linearly related to control input signal. This technique still has drawbacks. The integration time constant needs to be short in order to fully charge in one cycle. The higher open loop gain due to the short integration time constant decreases stability when the control loop is closed and increases the likelihood of limit cycling. Also, long cycle times are generated by small capacitor charge currents. These small currents result from subtracting two larger currents (reference and feedback). Noise in either of these two currents results in large pulse jitter. Finally, the cycle by cycle control technique does not address the energy needs of the energy storage capacitor in the output filter. During transients, the output voltage across the energy storage capacitor changes. In order to restore the voltage, the switching regulator must provide energy both to the load and to the energy storage capacitor. The energy supplied to the capacitor is transitory, being required only until the proper output voltage is restored. To supply the needs of the energy storage capacitor, the duty ratio control circuit must be given pre-emphasis during output voltage changes. Furthermore, this pre-emphasis must itself be a function of the output voltage. More pre-emphasis is needed at higher output voltage than at lower output voltage because the energy storage inductor in the switching regulator has less voltage across it and therefore builds current slower. Lack of pre-emphasis leads to poor transient response. This is especially critical for switching amplifiers, which must have fast response. It is also important in switching power supplies because they often supply power to transient loads.

Faulk, U.S. Pat. No. 5,680,036 (Oct. 21, 1997) and Schoft, patent U.S. Pat. No. 4,594,541 (Jun. 10, 1986) describe pre-distortion compensation schemes to linearize the control relationship. Tolerances and drift usually severely limit such compensation techniques.

OBJECTS AND ADVANTAGES

My switching regulator linearizes the relationship between the duty ratio of the pulse output and the control input signal without any of the above problems. A long time constant feedback circuit is used resulting in good stability and no limit cycling. Long cycle times are still generated from the subtraction of two currents (feedback and reference input), but both currents can be heavily filtered using long time constants. The feedback circuit averages the duty ratio of the pulse output and feeds the average back such that the steady state control sensitivity remains constant and not subject to tolerances and drift. The constant steady state control sensitivity helps to stabilize the circuit when used in conjunction with other control loops (not shown here).

Separate from the long time constant feedback circuit, a shorter time constant exponential capacitor charging circuit is used to generate the cycle time while keeping the ON-time (or the OFF-time) fixed. The exponential capacitor charging circuit results in a non-linear relationship between the duty ratio of the pulse output and the control input signal such that the transient control sensitivity increases exponentially as the control input signal increases. The increase in transient control sensitivity helps to charge the output energy storage capacitor quickly during transients, resulting in good transient response.

Thus, the present invention uses long time constants so is not prone to instability or limit cycling, uses heavy filtering of charge currents to provide long cycle times with low jitter, linearizes the relationship between the steady-state duty ratio of the pulse output and the control input, provides a non-linear relationship between the transient duty ratio of the pulse output and the control input, and is not subject to tolerances and drift.

DRAWING FIGURES

Figure 1:
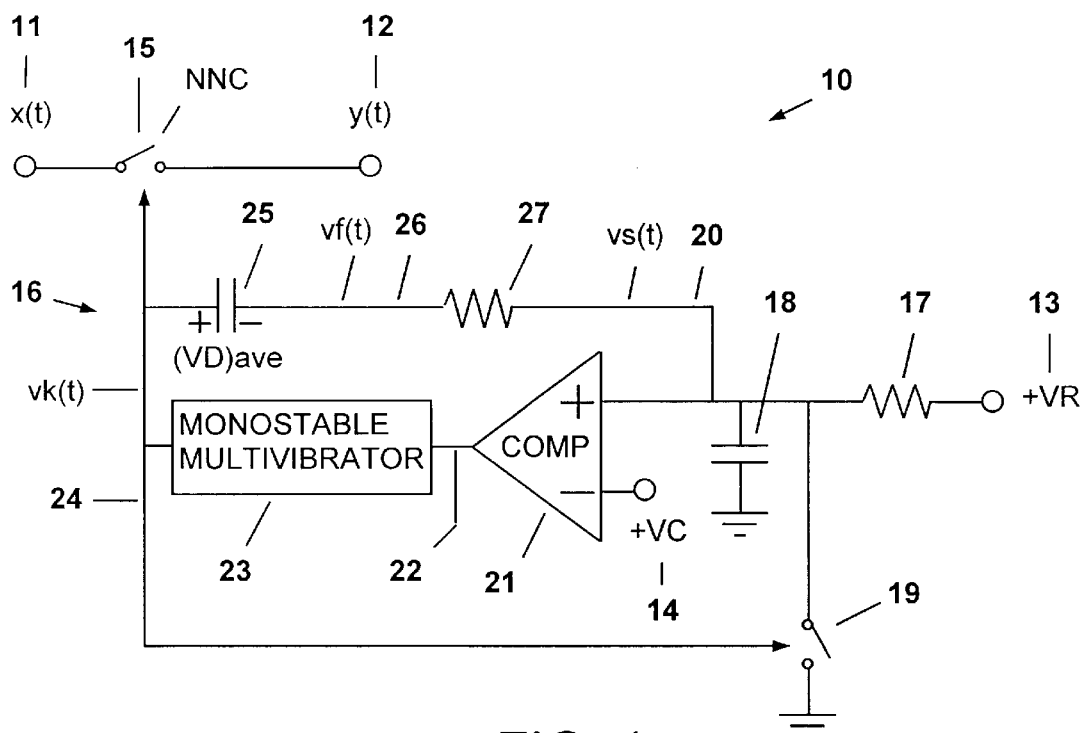
FIG. 1 is a schematic circuit diagram of a constant ON-time switching circuit constructed according to one aspect of the invention.
Figure 2:
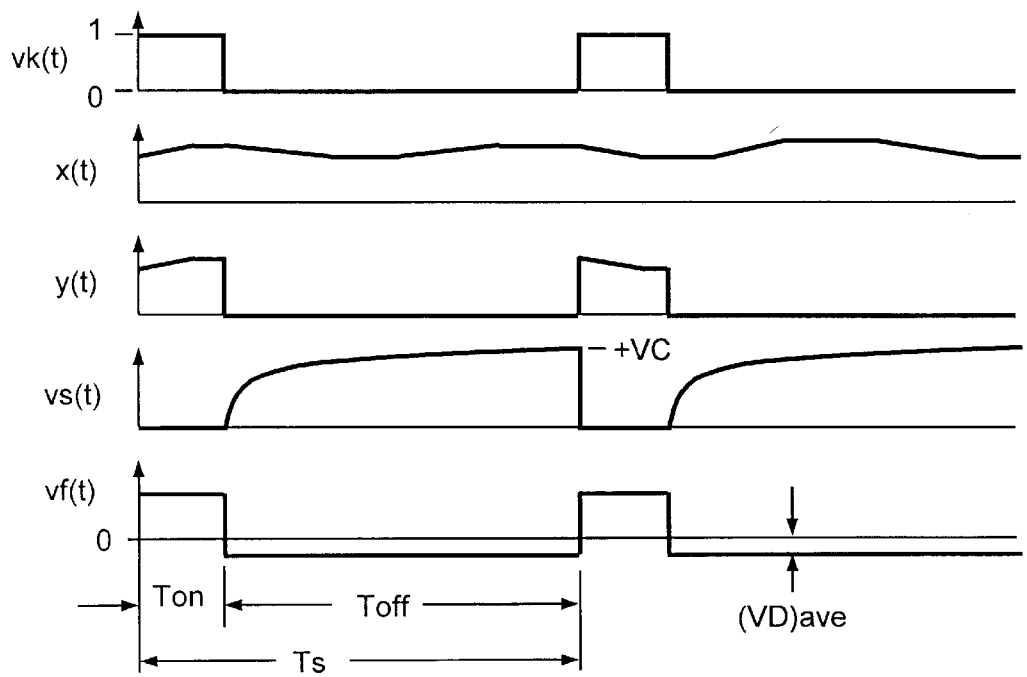
FIG. 2 is a timing diagram for the switching circuit in FIG. 1.

DESCRIPTION—FIGS. 1 and 2—PREFERRED EMBODIMENT

FIG. 1 of the drawings shows a constant ON-time switching circuit 10 constructed according to the invention. Generally, it includes an input node 11, an output node 12, a reference node 13, a control node 14, a switch 15, and a control circuit 16. Switch 15 is coupled to input node 11 and output node 12. It may take any of the various known forms including solid state switching circuitry. It has an ON state in which it couples input node 11 to output node 12 and an OFF state in which it decouples input node 11 from output node 12.

Control circuit 16 cycles switch 15 between the ON state and the OFF state in a series of periodic switching cycles of variable switch duty ratio in order to produce a chopped output signal y(t) at output node 12 from an input signal x(t) coupled to input node 11. One cycle is designated by Ts in FIG. 2. Ts for any cycle is the sum of the period of time the switch is in the ON state for that cycle (Ton) and the period of time the switch is in the OFF state for that cycle (Toff). The switch ON duty ratio for any cycle is the ratio of Ton to Ts. The switch OFF duty ratio for any cycle is the ratio of Toff to Ts.

Control circuit 16 produces a switch control signal vk(t) on a line 24. The switch control signal has two states. The first state is designated as a "0" state in FIG. 2 and it causes switch 15 to switch to the OFF state as well as causing 0 volts to appear on line 24. The second state is designated as a "1" state in FIG. 2 and it causes the switch to switch to the ON state as well as causing a predefined positive voltage to appear on line 24.

A reference voltage +VR coupled to reference node 13 serves as one input to the control circuit. The first terminal of a resistor 17 is coupled to the reference node. The second terminal of the resistor is coupled to a line 20. The voltage on line 20 is designated as vs(t) in FIG. 2. The first terminals of a capacitor 18 and a discharge switch 19 are coupled to line 20. The second terminals of the capacitor and the discharge switch are coupled to the circuit ground. The discharge switch is configured to be closed and discharge the capacitor when vk(t) is in state "1", and to be open when vk(t) is in state "0".

A control voltage +VC coupled to control node 14 serves as the negative input to a comparator 21. The positive input of the comparator is coupled to line 20. The output of the comparator is coupled by a line 22 to a monostable multivibrator 23. The monostable multivibrator produces an output pulse of fixed duration as the switch control signal vk(t).

The first terminal of a feedback capacitor 25 is coupled to line 24. The second terminal of the feedback capacitor is coupled to a line 26. The voltage on line 26 is designated as vf(t) in FIG. 2. The first terminal of a feedback resistor 27 is coupled to line 26. The second terminal of the feedback resistor is coupled to line 20. The average voltage between the first and second terminals of the feedback capacitor is designated as (VD)ave in FIG. 2.

OPERATION—FIGS. 1, 2, 3 and 4—PREFERRED EMBODIMENT

Control circuit 16 varies the switch control signal vk(t) between the "0" and "1" states to cycle switch 15 and vary the switch OFF duty ratio. It does so to produce the chopped output signal y(t) while controlling the switch OFF duty ratio such that there is approximately a linear relationship between the switch OFF duty ratio, the reference voltage +VR and the control voltage +VC. Timing is illustrated in the timing diagram of FIG. 2.

During the ON state of switch 15 (ON-time period), vk(t) is in the "1" state and feedback capacitor 25 charges. During the OFF state of the switch (OFF-time period), vk(t) is in the "0" state and the feedback capacitor discharges. The average voltage across the feedback capacitor, (VD)ave, is approximately linearly related to the switch ON duty ratio. During the OFF-time period, feedback voltage vf(t) is negative with an absolute value approximately equal to (VD)ave.

Capacitor 18 and the circuits which charge and discharge it form a comparison signal generator. During the OFF-time period, capacitor 18 charges with a current from the reference voltage +VR through resistor 17 and with a current from the feedback voltage vf(t) through feedback resistor 27 to produce a comparison voltage vs(t). The reference voltage helps to charge the capacitor. The feedback voltage helps to discharge the capacitor because vf(t) is negative during the OFF-time period so it pulls current from the capacitor.

During the OFF-time period, the voltage across capacitor 18, vs(t), continues to increase until it equals the control voltage +VC. This occurrence causes the comparator to respond by producing a trigger signal on line 22 which fires the monostable multivibrator 23 to change the switch control signal vk(t) to the "1" state for a constant ON-time period. During the ON-time period, reset switch 19 holds capacitor 18 in a discharged state. In some applications, constant ON-time is a circuit feature. In such a case, no monostable multivibrator is necessary to achieve constant ON-time control.

A typical cycle starts with switch 15 in the ON state and vk(t) in the "1" state. After the constant ON-time period, vk(t) goes to the "0" state to begin the OFF state of the switch. During the OFF state, the voltage vs(t) eventually reaches the value of the control voltage +VC whereupon monostable multivibrator 23 fires to begin the ON state of the switch for the next cycle.

Without the feedback voltage vf(t), as voltages +VR and +VC are adjusted in order to produce large switch OFF duty ratios, the sensitivity of the OFF duty ratio of switch 15 to either +VR or +VC would increase exponentially due to the exponential flattening of the vs(t) charge curve. The increase in sensitivity is more clearly shown in FIGS. 3 and 4. In FIG.

Figure 3:
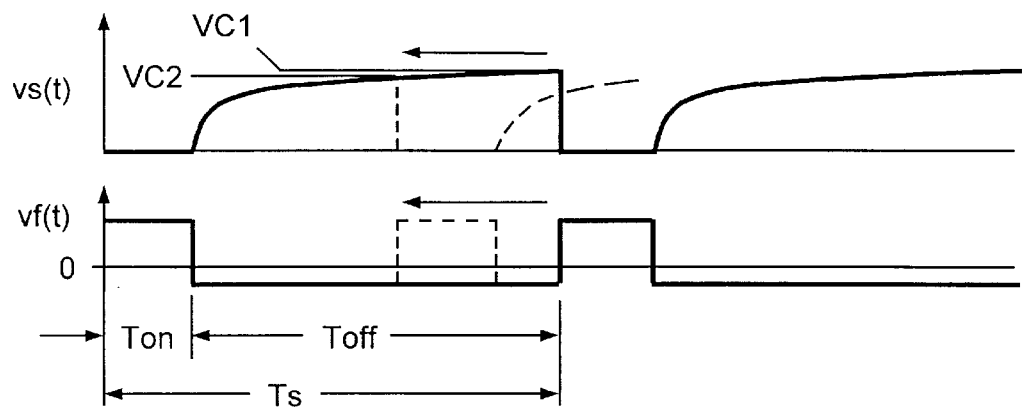
FIG. 3 is a detailed timing diagram for the switching circuit in FIG. 1 for control input voltages VC1 and VC2 (VC1 being larger than VC2).
Figure 4:
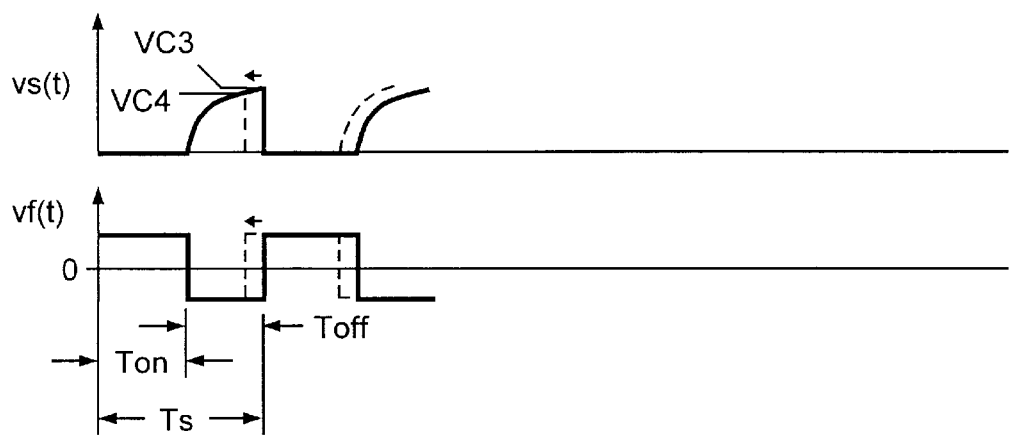
FIG. 4 is a detailed timing diagram for the switching circuit in FIG. 1 for control input voltages VC3 and VC4 (VC3 being less than VC2 but larger than VC4).

3 the solid curves correspond to control voltage VC1 and the dashed curves correspond to a slightly lower control voltage VC2. As can be seen in FIG. 3 a small change in control voltage (VC1–VC2) produces a large change in switch OFF duty ratio (Toff/Ts). In FIG. 4 the solid curves correspond to control voltage VC3 and the dashed curves correspond to a slightly lower control voltage VC4. Voltages VC3 and VC4 are lower than voltages VC1 and VC2. As can be seen in FIG. 4 a small change in control voltage (VC3–VC4) produces a small change in switch OFF duty ratio (Toff/Ts). So FIG. 3 shows increased sensitivity to control voltage than FIG. 4.

The above increased sensitivity of the OFF duty ratio of switch 15 translates to high open loop gain and would cause instability when the main control loop (not shown here) is closed. The feedback voltage vf(t) prevents such increased sensitivity. As the OFF-time period increases, switch ON duty ratio decreases and less voltage is stored across feedback capacitor 25, so less current will be pulled from capacitor 18 during the OFF-time period. This cancels the exponential flattening of the vs(t) charge curve because the current pulled from capacitor 18 through feedback resistor 27 diminishes to zero just as fast as the switch ON duty ratio diminishes to zero. In the limit as the OFF-time period gets very large, the switch OFF duty ratio becomes proportional to the +VC control voltage.

Although a logarithmic capacitor charging circuit was used to charge capacitor 18, any type of charging circuit can be used, provided that as control voltage +VC is increased, the charge circuit without feedback voltage vf(t) applied causes ramp voltage vs(t) to increase in time at the same rate or at a slower rate than that which would result in a linear relationship between the control voltage +VC and the OFF duty ratio. A slower rate of increase of the ramp voltage in time would, without the presence of the feedback voltage, cause the OFF time to increase too quickly as control voltage +VC is increased. The negative feedback effect of the feedback voltage reduces the rate of increase of the OFF time and forces the OFF duty ratio to be proportional to the control voltage +VC. This is very advantageous because it is easy to generate a logarithmic ramp. A logarithmic ramp has a rate of increase in time which is too slow as time gets large.

ADVANTAGES—FIGS. 1 and 2—PREFERRED EMBODIMENT

The long time constant of feedback capacitor 25 and feedback resistor 27 (feedback time constant) results in good stability without limit cycling when the circuit of FIG. 1 is used in conjunction with other feedback control loops (not shown here). The long time constant also reduces switching jitter.

The logarithmic charging of capacitor 18 through resistor 17 from reference voltage +VR results in increased sensitivity of the fire threshold of comparator 21 as the control voltage +VC is increased for times less than the feedback time constant. This increased sensitivity to +VC improves the transient response of the output y(t) by quickly charging the output energy storage capacitor (not shown here) at output node 12.

At times greater than the feedback time constant, the above increased sensitivity of the fire threshold is removed by current fed back through resistor 27 resulting from capacitor 25 charging to a new voltage. The new voltage that capacitor 25 charges to, being proportional to the ON duty ratio of switch 15, results in a current proportional to the ON duty ratio being subtracted from the current charging capacitor 18. The resultant current charging capacitor 18 makes the response between the OFF duty ratio of switch 15 and the control voltage +VC linear at times greater than the feedback time constant. Such linearity insures stability when the circuit of FIG. 1 is used in conjunction with other feedback control loops (not shown here).

Figure 5:
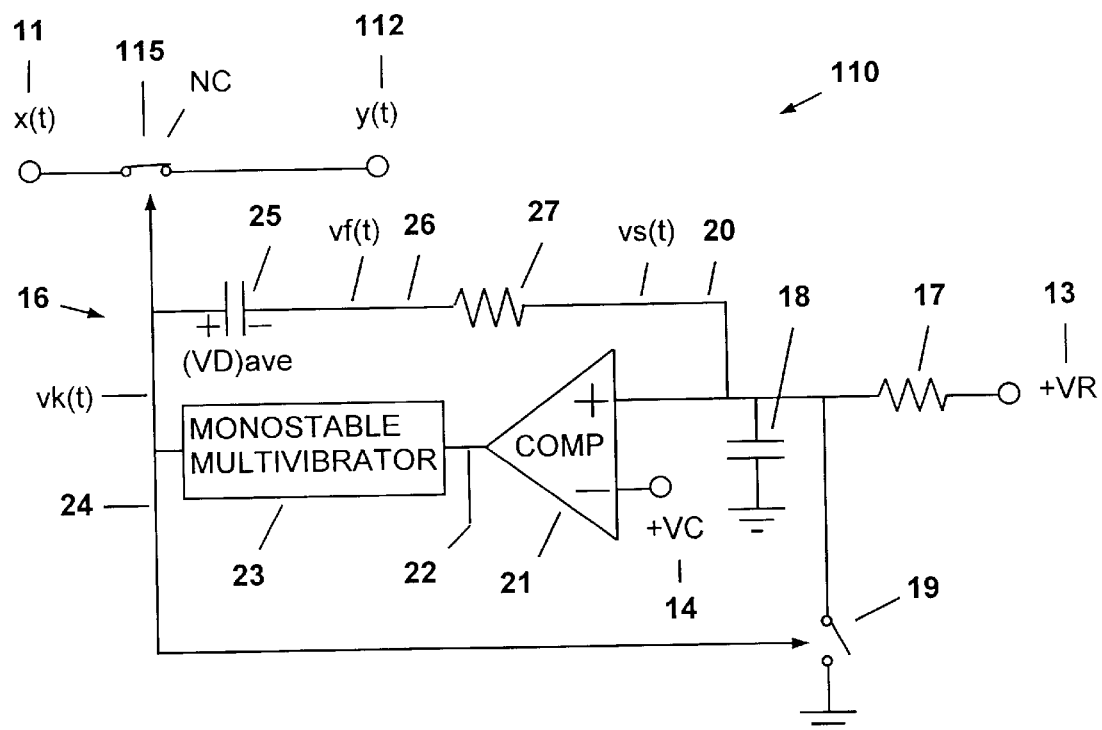
FIG. 5 is a schematic circuit diagram of a constant OFF-time second embodiment of a switching circuit constructed according to the invention.
Figure 6:
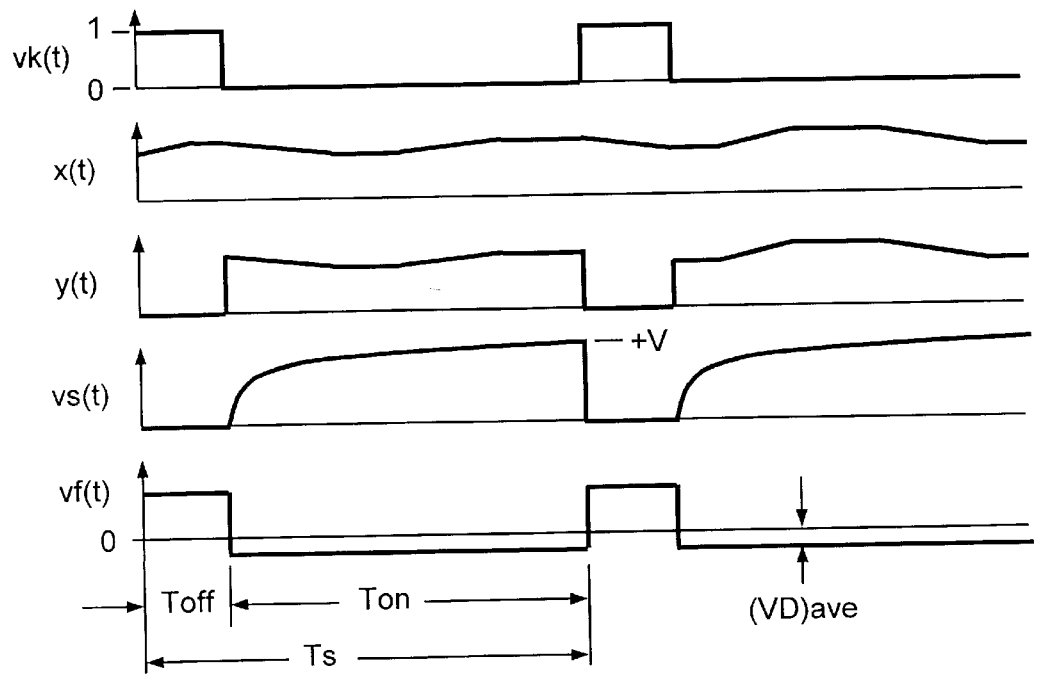
FIG. 6 is a timing diagram for the second embodiment.

DESCRIPTION and OPERATION—FIGS. 5 and 6—SECOND EMBODIMENT

FIG. 5 shows another switching circuit 110 constructed according to the invention. It is similar in most respects to switching circuit 10 and so only differences are described in further detail. For convenience, reference numerals designating parts of switching circuit 110 which differ from those of switching circuit 10 are increased by one hundred over those designating corresponding parts of switching circuit 10.

The difference is the sense of switch 115. In switching circuit 110, the "0" state of signal vk(t) causes the switch to switch to the ON state, and the "1" state of signal vk(t) causes the switch to switch to the OFF state. This results in a constant OFF-time pulse output y(t) at node 112. The operation and advantages of switching circuit 110 are identical to that of switching circuit 10 if all the OFF terms and ON terms in circuit 10 are exchanged. Timing for circuit 110 is illustrated in the timing diagram of FIG. 6.

Figure 7:
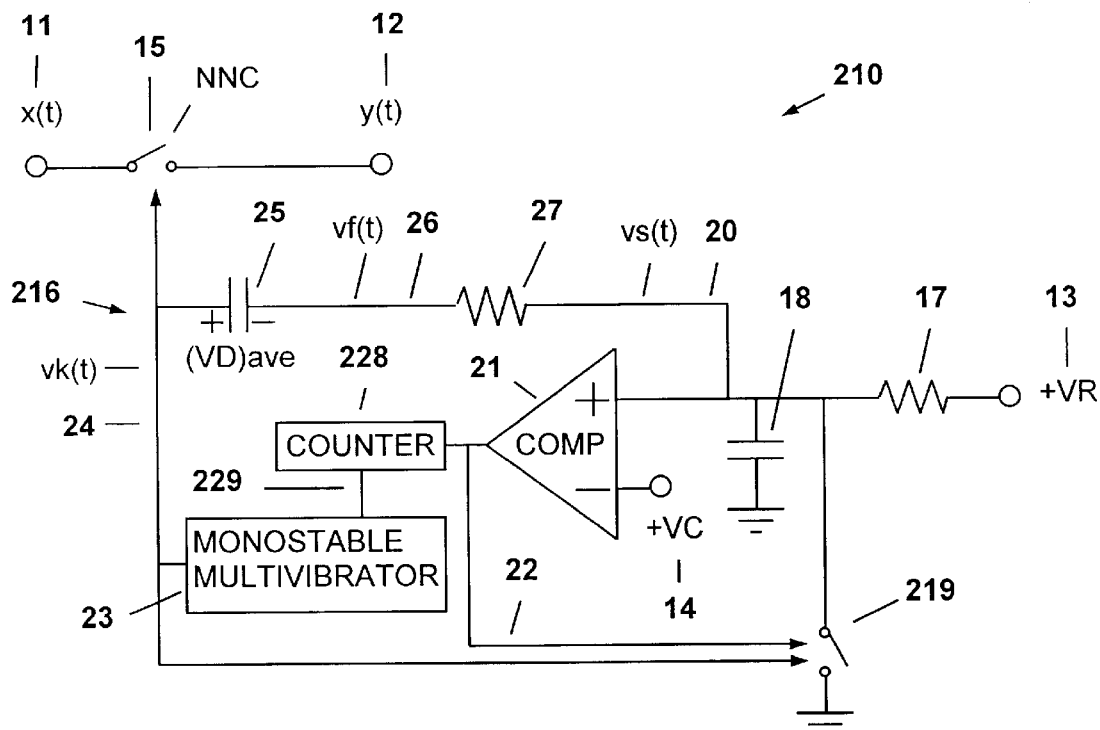
FIG. 7 is a schematic circuit diagram of a constant ON-time third embodiment of a switching circuit constructed according to the invention.
Figure 8:
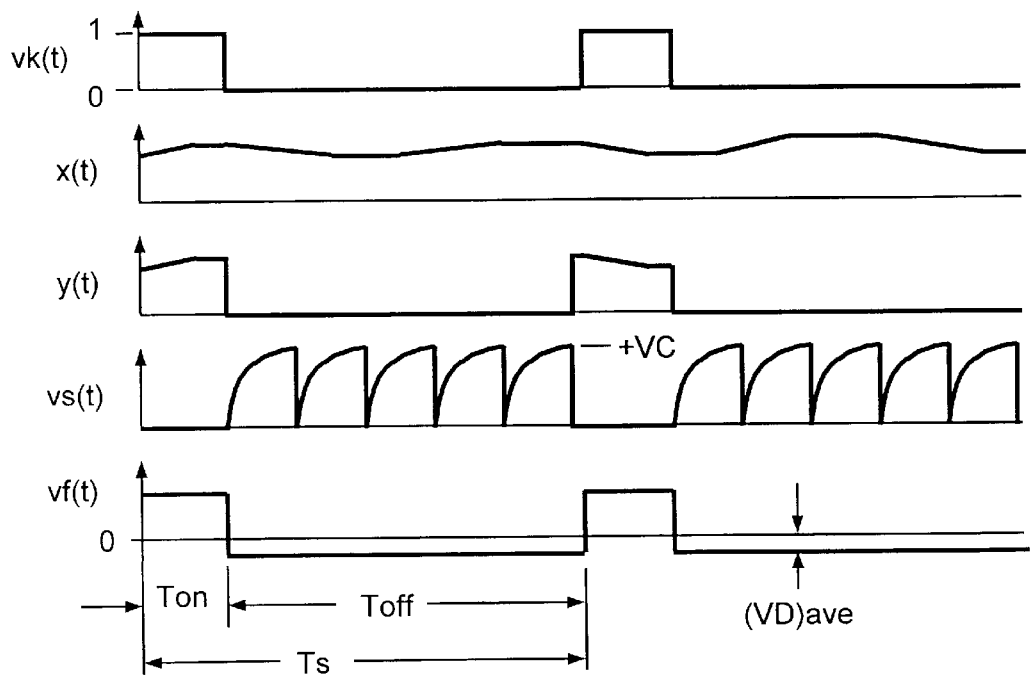
FIG. 8 is a timing diagram for the third embodiment.

DESCRIPTION and OPERATION—FIGS. 7 and 8—THIRD EMBODIMENT

FIG. 7 shows another switching circuit 210 constructed according to the invention. It is similar in many respects to switching circuit 10 and so only differences are described in further detail. For convenience, reference numerals designating parts of switching circuit 210 which differ from those of switching circuit 10 are increased by two hundred over those designating corresponding parts of switching circuit 10.

The difference is the addition of a counter 228 to control circuit 216. The counter is coupled to the comparator by line 22 and to the monostable multivibrator by a line 229. The trigger signal from the comparator clocks counter 228 and resets switch 219 upon each occurrence of voltage vs(t) being equal to voltage +VC. When the counter reaches a predetermined count, it fires the multivibrator. Switch 219 is held in reset during the multivibrator's time period. The remaining operation of switching circuit 210 are identical to that of switching circuit 10. Timing for circuit 210 is illustrated in the timing diagram of FIG. 8.

In addition to having the same advantages as switching circuit 10, switching circuit 210 has the additional advantage of providing very long ON or OFF time periods, due to the inclusion of the counter.

Figure 9A:
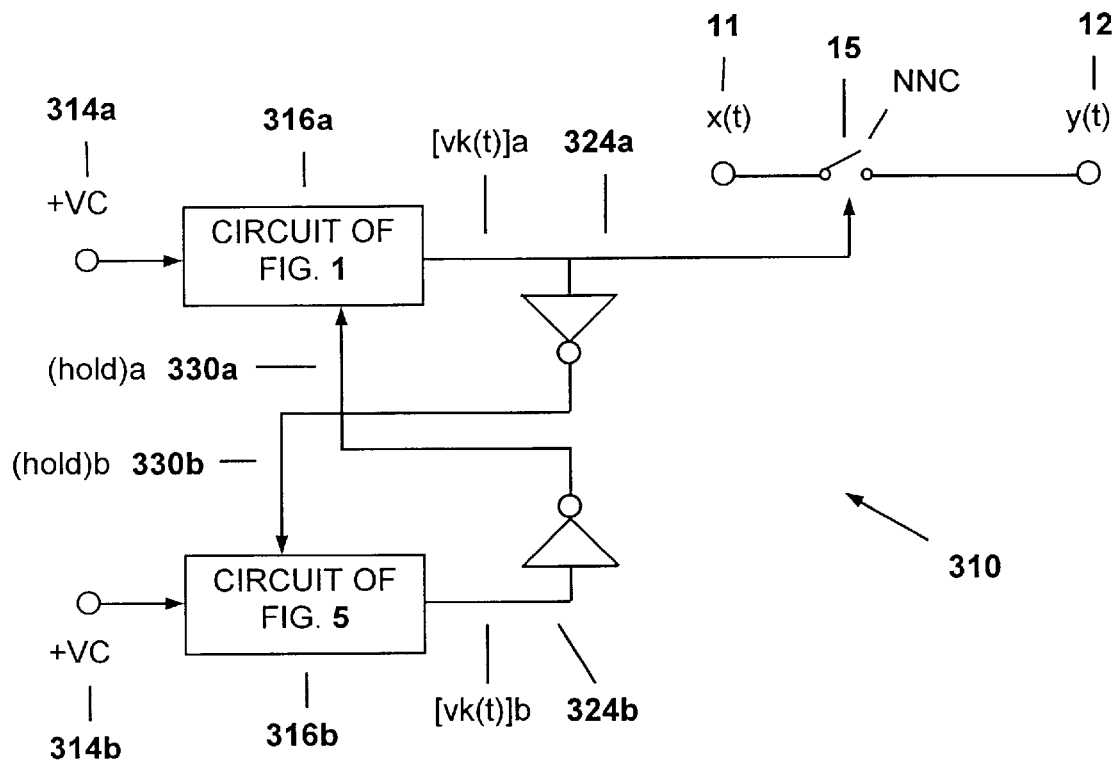
FIG. 9a is a schematic circuit diagram of a variable OFF-time and variable ON-time fourth embodiment of a switching circuit constructed according to the invention.

DESCRIPTION and OPERATION—FIG. 9a—FOURTH EMBODIMENT

FIG. 9a shows another switching circuit 310 constructed according to the invention. It is similar in many respects to switching circuit 10 and so only differences are described in further detail. For convenience, reference numerals designating parts of switching circuit 310 which differ from those of switching circuit 10 are increased by 300 hundred over those designating corresponding parts of switching circuit 10.

This embodiment is a combination of the circuits of FIG. 1 and FIG. 5 in a complimentary configuration controlling a single switch. Signal (hold)a on line 330a has two states. The first state, designated as a "1" state, adds a hold on circuit 316a. The second state, designated as a "0" state, removes the hold on circuit 316a. Likewise for signal (hold)b with the "a" replaced by "b" in the above.

Signal (hold)a, in state "1", forces the monostable multivibrator in circuit 316a to stay ON. This forces the switch control signal [vk(t)]a to stay in state "1", which causes switch 15 to stay in the ON state and a positive voltage to appear on line 324a, which causes signal (hold)b on line 330b to stay in state "0". Signal (hold)b in state "0" allows the monostable multivibrator in circuit 316b to go OFF.

The monostable multivibrator in circuit 316b will stay OFF for a time determined by input voltage +VCb at node 314b. After that time it will go ON causing a positive voltage to appear on line 324b which will cause signal (hold)a to go to state "0". This allows the monostable multivibrator in circuit 316a to go OFF. This cause switch control signal [vk(t)]a to go to state "0", which causes switch 15 to go to the OFF state and 0 volts to appear on line 324a which causes signal (hold)b to go to state "1".

The monostable multivibrator in circuit 316a will stay OFF for a time determined by input voltage +VCa at node 314a. After that time it will go ON causing switch 15 to go to the ON state and signal (hold)b to go to state "0". This allows the multivibrator in circuit 316b to go OFF which causes signal (hold)a to go to state "1", beginning a new cycle.

The result of the above operation is that the period of time that the switch 15 is in the ON state is controlled by input voltage +VCb, and the period of time that the switch is in the OFF state is controlled by input voltage +VCa. Holding voltage +VCb fixed results in constant ON-time operation. Holding voltage +VCa fixed results in constant OFF time operation.

A switching regulator can be constructed by switching between the above two modes of operation when the switch 15 is at 50% duty ratio. Such a regulator will have an output signal y(t), at node 12, with a range from 0 to x(t), where x(t) is the input signal at node 11.

Figure 9B:
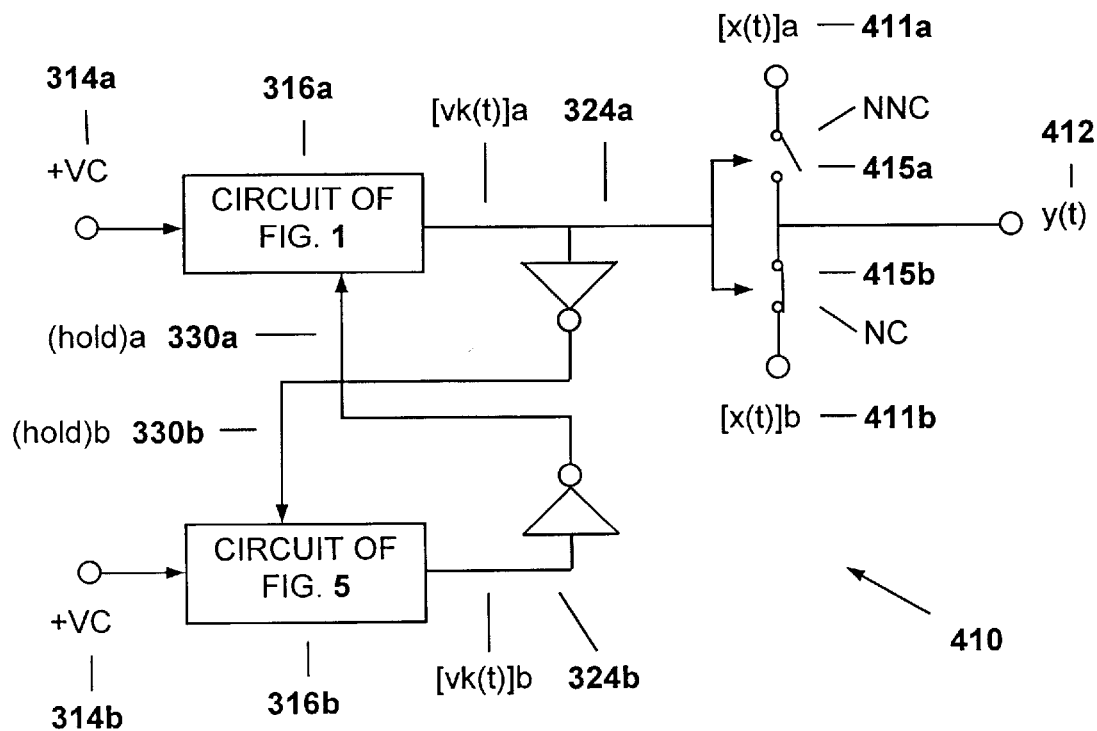
FIG. 9b is a schematic circuit diagram of a complimentary output, variable OFF-time and variable ON-time fifth embodiment of a switching circuit constructed according to the invention.

DESCRIPTION and OPERATION—FIG. 9b— FIFTH EMBODIMENT

FIG. 9b shows another switching circuit 410 constructed according to the invention. It is similar in many respects to switching circuit 310 and so only differences are described in further detail. For convenience, reference numerals designating parts of switching circuit 310 which differ from those of switching circuit 310 are increased by 400 hundred over those designating corresponding parts of switching circuit 310.

This difference is that switch 15 in circuit 310 has been replaced by complimentary switches 415a and 415b in circuit 410. Also, Input signal x(t) at node 11 in circuit 310 has been replaced by complimentary input signals [x(t)]a and [x(t)]b at nodes 411a and 411b, respectively, in circuit 410. Signal [x(t)]a could be +15 volts and signal [x(t)]b could be −15 volts. Signal [vk(t)]a on node 324a controls both switches simultaneously so that when one switch is ON the other is OFF. The output signal y(t) is at node 412, which is the junction of the two switches. If the input signals [x(t)]a and [x(t)]b are +15 volts and −15 volts, then the output signal y(t) has a range from −15 volts to +15 volts. Also, the output signal y(t) would be approximately 0 volts at 50% switch duty ratio. Such a configuration would be ideal as a Class D switching amplifier.

ALTERNATIVE EMBODIMENTS

Other switching circuits can be constructed according to the invention. For example, switching circuit 210 can be used with normally closed switch 115. Signal [vk(t)]b could have been used to control the switch in the circuits of FIG. 9a or FIG. 9b in place of signal [vk(t)]a. Switching circuits can also be constructed which combine parts of circuits 10, 110, 210, 310, and 410. Such combination switching circuits may also share components, such as switch 15. These modifications and combination switching circuits can be made by one of ordinary skill in the art without necessarily departing from the spirit and scope of the invention.

CONCLUSION, RAMIFICATIONS, AND SCOPE

The use of long time constant feedback results in good stability without limit cycling, is insensitive to tolerances and drift, and also reduces switching jitter. Increased transient control sensitivity improves the transient response of the output y(t). Linear steady state control response insures stability when the circuit is used in conjunction with other feedback control loops (not shown here).

Although the description above contains many specifities, these should not be construed as limiting the scope of the invention, but as merely providing illustrations of some of the preferred embodiments of this invention.

For example, although an averaging capacitor was used to obtain the feedback voltage vf(t), any averaging circuit which averages the switch duty ratio can be used. Although the control voltage +VC and the reference voltage +VR were assumed to be constant for ease of understanding the concepts involved, this invention places no such limitations on either voltage. Either +VC or +VR or both voltages can be time varying voltages so that this invention will act as a linear amplifier. In the fourth and fifth embodiments, although hold inputs were assumed to hold the opposite monostable multivibrators in the triggered state, the multivibrators could instead be self-latching circuits with the hold inputs resetting the opposite latches.

Thus the scope of the invention should be determined by the appended claims and their legal equivalents, rather than by the examples given.

What is claimed is:

1. A switching circuit, comprising:

an input node, an output node, and a control node;

a switch coupled to said input node and said output node, said switch having an on state in which it couples said input node to said output node and an off state in which it decouples said input node from said output node;

means in the form of a control circuit for cycling said switch between the on state and the off state in a periodic series of cycles of variable switch duty ratio in order to produce a chopped signal at said output node from an input signal coupled to said input node;

said control circuit including means for producing a feedback signal that has a level that is substantially linearly related to the time-integrated value of the switch duty ratio, wherein said switch duty ratio is integrated over more than one cycle;

said control circuit including means for generating a ramp signal responsive to said feedback signal, the amplitude of said ramp signal varies as a function of time, such that the instantaneous absolute value of said ramp signal is increasing in time and the instantaneous absolute value of slope of said ramp signal is decreasing in time;

said control circuit including means responsive to said ramp signal and a control signal coupled to said control node for resetting said ramp signal and for varying the switch duty ratio in order to maintain the average value of the switch duty ratio approximately linearly related to the average value of said control signal;

whereby said switching circuit can be used as an element in a switching power supply or switching amplifier to provide substantially linear control of switch duty ratio at any average level of said chopped signal.

2. A switching circuit as recited in claim 1, further including:

means in the form of a comparator circuit for producing a trigger signal indicative of an occurrence of a condition in which the level of said ramp signal equals the level of said control signal;

wherein said control circuit is configured to reset said ramp signal and to switch said switch to the on state upon each occurrence of said trigger signal, and to then switch said switch back to the off state until the next occurrence of that condition.

3. A switching circuit as recited in claim 1, further including:

means in the form of a comparator circuit for producing a trigger signal indicative of an occurrence of a condition in which the level of said ramp signal equals the level of said control signal;

wherein said control circuit is configured to reset said ramp signal and to switch said switch to the off state upon each occurrence of said trigger signal, and to then switch said switch back to the on state until the next occurrence of that condition.

4. A switching circuit as recited in claim 1, wherein:

said means for producing said feedback signal includes only passive elements.

5. A switching circuit as recited in claim 4, further including:

means in the form of a comparator circuit for producing a trigger signal indicative of an occurrence of a condition in which the level of said ramp signal equals the level of said control signal;

wherein said control circuit is configured to reset said ramp signal and to switch said switch to the on state upon each occurrence of said trigger signal, and to then switch said switch back to the off state until the next occurrence of that condition.

6. A switching circuit as recited in claim 4, further including:

means in the form of a comparator circuit for producing a trigger signal indicative of an occurrence of a condition in which the level of said ramp signal equals the level of said control signal;

wherein said control circuit is configured to reset said ramp signal and to switch said switch to the off state upon each occurrence of said trigger signal, and to then switch said switch back to the on state until the next occurrence of that condition.

7. A method of producing a chopped signal, comprising:

providing a switching circuit having an input node, an output node, a control node, and a switch coupled to said input node and said output node, said switch having an on state in which it couples said input node to said output node and an off state in which it decouples said input node from said output node;

cycling said switch between the on state and the off state in a periodic series of cycles of variable switch duty ratio in order to produce a chopped signal at said output node from an input signal coupled to said input node;

averaging the value of the switch duty ratio over more than one cycle in order to produce a feedback signal that has a level that is substantially linearly related to the time-integrated value of the switch duty ratio;

producing a ramp signal responsive to said feedback signal which varies as a function of time, such that the instantaneous absolute value of said ramp signal is increasing in time and the instantaneous absolute value of slope of said ramp signal is decreasing in time;

resetting said ramp signal and varying the switch duty ratio in response to said ramp signal and a control signal coupled to said control node in order to maintain the average value of the switch duty ratio approximately linearly related to the average value of said control signal.

8. A method as recited in claim 7, further comprising:

producing a trigger signal indicative of an occurrence of a condition in which the level of said ramp signal equals the level of said control signal;

switching said switch to the on state upon each occurrence of said trigger signal, and then switching said switch back to the off state until the next occurrence of said trigger signal.

9. A method as recited in claim 7, further comprising:

producing a trigger signal indicative of an occurrence of a condition in which the level of said ramp signal equals the level of said control signal;

switching said switch to the off state upon each occurrence of said trigger signal, and then switching said switch back to the on state until the next occurrence of said trigger signal.

10. A method as recited in claim 7, further comprising:

producing said feedback signal using only passive elements.

11. A method as recited in claim 10, further comprising:

producing a trigger signal indicative of an occurrence of a condition in which the level of said ramp signal equals the level of said control signal;

switching said switch to the on state upon each occurrence of said trigger signal, and then switching said switch back to the off state until the next occurrence of said trigger signal.

12. A method as recited in claim 10, further comprising:

producing a trigger signal indicative of an occurrence of a condition in which the level of said ramp signal equals the level of said control signal;

switching said switch to the off state upon each occurrence of said trigger signal, and then switching said switch back to the on state until the next occurrence of said trigger signal.

* * * * *